(12) United States Patent
Stoetzl (10) Patent No.: US 11,110,847 B2
(45) Date of Patent: Sep. 7, 2021

(54) EXPANDABLE VEHICLE SHELTER SYSTEM AND METHOD

(71) Applicant: Strato Gear Corp., Edmonds, WA (US)

(72) Inventor: Mark Stoetzl, Edmonds, WA (US)

(73) Assignee: Strato Gear Corp., Edmonds, WA (US)

( * ) Notice: Subject to any disclaimer, the term of this patent is extended or adjusted under 35 U.S.C. 154(b) by 253 days.

(21) Appl. No.: 16/420,936

(22) Filed: May 23, 2019

(65) Prior Publication Data

US 2019/0291629 A1 Sep. 26, 2019

Related U.S. Application Data

(63) Continuation of application No. 15/680,032, filed on Aug. 17, 2017, now Pat. No. 10,343,586.

(60) Provisional application No. 62/385,489, filed on Sep. 9, 2016.

(51) Int. Cl.
*B60P 3/34* (2006.01)
*B60J 7/02* (2006.01)
*B62D 33/04* (2006.01)

(52) U.S. Cl.
CPC ............. *B60P 3/34* (2013.01); *B60J 7/024* (2013.01); *B60P 3/341* (2013.01); *B62D 33/04* (2013.01)

(58) Field of Classification Search
CPC ............. B60P 3/34; B60J 7/024; B62D 33/04
USPC ...... 296/26.13, 173, 175, 26.05, 26.09, 156, 296/26.04, 165
See application file for complete search history.

(56) References Cited

U.S. PATENT DOCUMENTS

| | | | | |
|---|---|---|---|---|
| 1,578,390 | A | * 3/1926 | Brown | ................. B60P 3/341 296/169 |
| 3,583,755 | A | 6/1971 | Hedrick, Jr. | |
| 3,966,250 | A | 6/1976 | Winskas | |
| 4,012,070 | A | * 3/1977 | Mertz | ................... B60P 3/32 296/175 |

(Continued)

FOREIGN PATENT DOCUMENTS

| | | |
|---|---|---|
| CA | 2107738 A1 | 4/1994 |
| CA | 2470169 A1 | 12/2004 |

(Continued)

OTHER PUBLICATIONS

International Search Report and Written Opinion dated Nov. 16, 2017, International Patent Application No. PCT/US2017/047429, filed Aug. 17, 2017, 8 pages.

(Continued)

*Primary Examiner* — D Glenn Dayoan
*Assistant Examiner* — E Turner Hicks
(74) *Attorney, Agent, or Firm* — Davis Wright Tremaine LLP (57) ABSTRACT

A shelter system configured to removably couple with a vehicle. The shelter system includes a top portion and a bottom portion that are slidably coupled such that the top and bottom portions are operable to assume a collapsed configuration with the top and bottom portions nested together with a shelter cabin having a first volume. The shelter system is also configured to assume an extended configuration having the top portion extending upward with the shelter cabin having a second volume that is greater than the first volume.

19 Claims, 11 Drawing Sheets

(56) References Cited

U.S. PATENT DOCUMENTS

| | | | | |
|---|---|---|---|---|
| 4,294,484 A | * | 10/1981 | Robertson | B60P 3/34 135/88.13 |
| 5,028,088 A | | 7/1991 | Del Monico et al. | |
| 6,435,594 B1 | * | 8/2002 | Ekonen | B60J 7/041 296/100.09 |
| 6,679,542 B1 | * | 1/2004 | Semotuk | B60P 3/341 296/165 |
| 6,712,422 B1 | | 3/2004 | Vaillancourt | |
| 7,404,590 B2 | * | 7/2008 | Loranger | E04H 15/06 296/159 |
| 7,527,318 B2 | * | 5/2009 | Geise | B60P 3/341 296/100.06 |
| 9,156,391 B2 | | 10/2015 | Loranger | |
| 2002/0140252 A1 | * | 10/2002 | Neville | B60P 3/341 296/164 |
| 2014/0367991 A1 | | 12/2014 | Loranger | |

FOREIGN PATENT DOCUMENTS

| | | |
|---|---|---|
| DE | 20317018 U1 | 2/2004 |
| EP | 2281716 A1 | 2/2011 |
| FR | 2775636 A1 | 9/1999 |
| FR | 2809676 A1 | 12/2001 |
| RU | 2038230 C1 | 6/1995 |
| RU | 2301747 C2 | 6/2007 |
| RU | 109708 U1 | 10/2011 |

OTHER PUBLICATIONS

U.S. Appl. No. 15/680,032, filed Aug. 17, 2017.

* cited by examiner

EXPANDABLE VEHICLE SHELTER SYSTEM AND METHOD

CROSS-REFERENCE TO RELATED APPLICATIONS

This application is a continuation of U.S. application Ser. No. 15/680,032, filed Aug. 17, 2017, which is a non-provisional of and claims the benefit of U.S. Provisional Application No. 62/385,489, filed Sep. 9, 2016, which applications are hereby incorporated herein by reference in their entirety and for all purposes.

BACKGROUND

Collapsible shelters/structures have been created for both moving vehicles and dwellings since modern house and vehicle construction has been taking place. The vehicle shelters that are currently used are either very large and heavy related to the vehicle or are too small to provide adequate space inside for the user. Once installed on a vehicle, the shelter diminishes the overall original aerodynamic qualities of the vehicle and accessibility. On a pickup, full access to the rear of the bed is lost. Usually, to get adequate height for the user, the shell roof permanently extends above and past the height of the vehicle roof. To create more space, the shelter sides also permanently extend past the vehicle sides.

There currently is no shelter/structure that provides both a compact streamlined interface between the shelter and vehicle, while also providing a large spacious living area with full head room height. In addition the shelters do not provide full access to the rear of the pickup when needed. Additional inventions are needed to meet these un-fulfilled needs.

Also, there currently exists portable storage and living areas/shelters, but they do not provide a securable and lockable environment that can quickly and easily be transformed from a small square footage area to a larger square footage structure. Based on this, additional inventions are needed to fulfill unmet needs. In view of the foregoing, a need exists for an improved expandable vehicle shelter system and method in an effort to overcome the aforementioned obstacles and deficiencies of conventional systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Embodiments include an expandable height vehicle shelter system with vertically oriented side hatches that open up to create additional overall width, plus a full-size top-hinged rear door assembly that opens up to allow complete access to the rear of a cabin defined by the shelter system. A top half of the shelter system can be supported by front and rear overlapping panels that are joined together in some embodiments by a sliding track and/or roller track respectively. When the top half of the vehicle shelter system is in a raised position, flexible fabric curtains, which are normally stowed behind the side hatches, deploy to form sides of the shelter and additionally define compartments within the cabin.

With the side hatches opened and in a horizontal position, the flexible fabric curtains originate at the outer edge of the opened side hatches and span to lower deployable platforms. The platforms can be attached to the shelter base and can rotate from vertical to horizontal position for deployment. When in the horizontal position, the platforms create a sleeping or storage compartment on each side of the shelter system. When the large rear door assembly is closed, additional access to the rear of the shelter cabin can be provided by a smaller rear sub-door that is nested within the large door assembly. The smaller rear sub-door can also have overlapping panels that are joined together by a roller track or the like. The lower-half of the small sub-door can be fixed to the bottom of a large door cross brace and can be configured to open like a conventional house door.

Figure 1A:
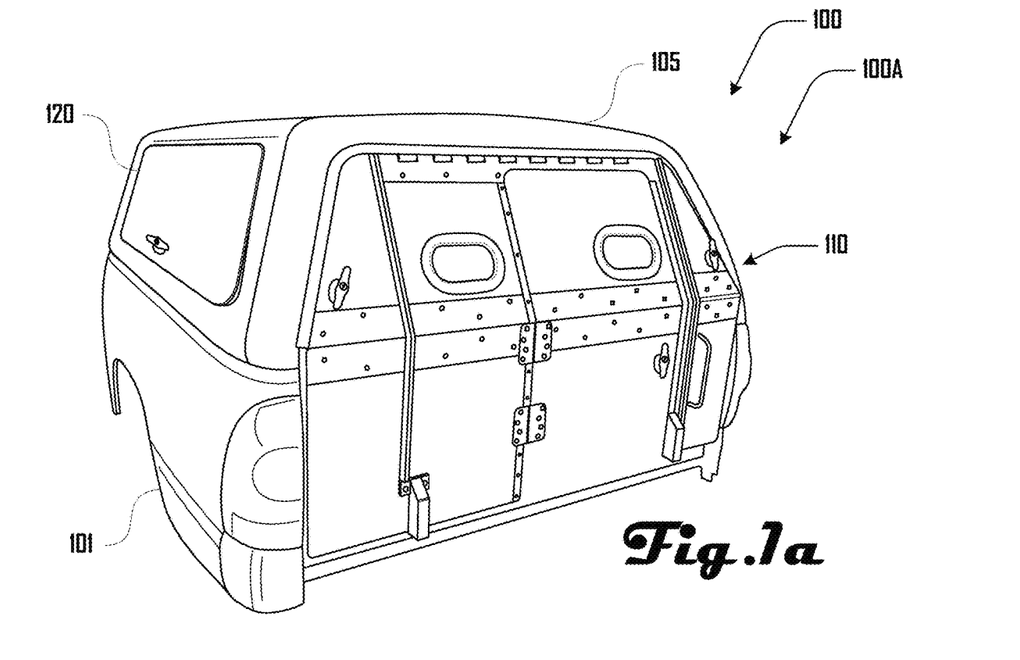
FIG. 1a is an exemplary perspective drawing illustrating an embodiment of an expandable vehicle shelter system in a collapsed configuration.
Figure 1B:
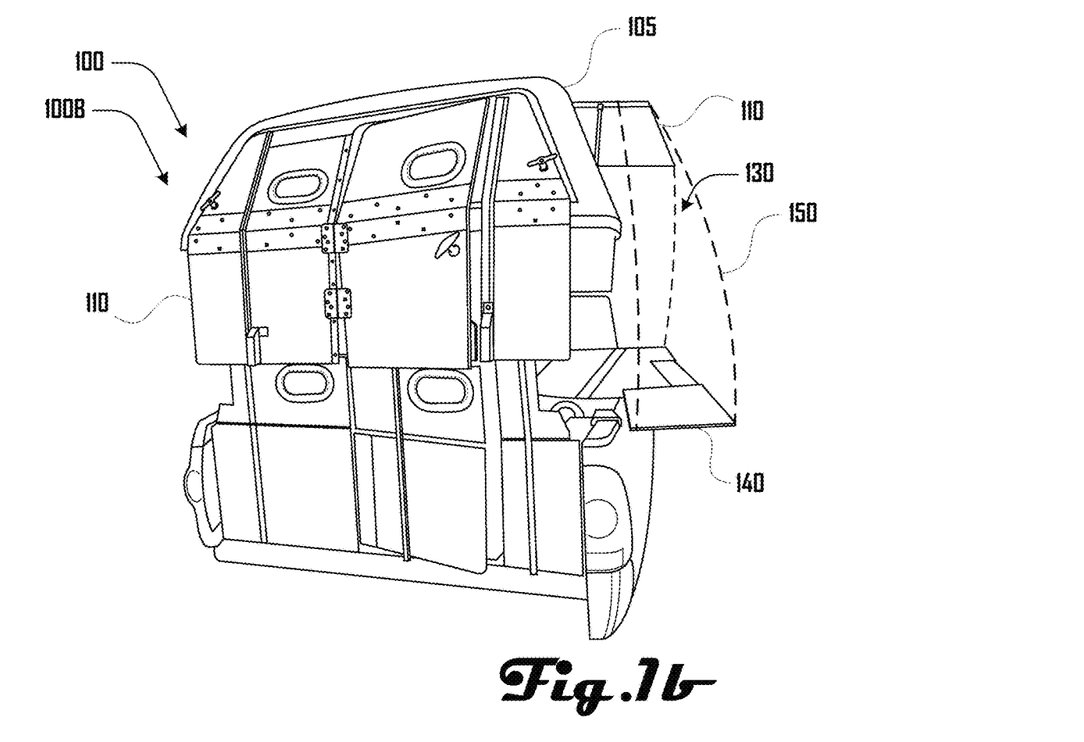
FIG. 1b is a perspective drawing of the expandable vehicle shelter system of FIG. 1a in an expanded configuration.

Turning to FIGS. 1a and 1b, an example expandable vehicle shelter system 100 is shown coupled to a vehicle 101 in a collapsed configuration 100A and expanded configuration 100B respectively. The vehicle shelter system 100 comprises a shell 105, a door assembly 110 and a first and second hatch 120 disposed on opposing sides of the shell 105. In the expanded configuration illustrated in FIG. 1b, the hatches 120 can open to define compartments 130 on opposing sides of the shell 105, which are also defined by a respective platform 140 and curtain 150, which are described in more detail herein.

In various examples, the expandable vehicle shelter system 100 can be an aftermarket product that can be configured to couple with the bed of a truck to form a shelter defined by the bed of the truck and the shelter system 100. Accordingly, in various examples, the shelter system 100 can be configured to removably couple with various suitable configurations of truck beds of various makes and models of trucks.

For example, in various embodiments, the shelter system 100 can be used for camping or other recreational activities and a user can attach the shelter system 100 to a truck; travel to a camping location with the shelter system 100 in the collapsed configuration 100B illustrated in FIG. 1a; and then expand the shelter system 100 for camping as shown in the example expanded configuration 100B shown in FIG. 1b. After use, the user can re-configure the shelter system 100 into the collapsed configuration 100A and travel back home, where the user can remove the shelter system 100 from the truck such that normal use of the truck can resume without the shelter system 100.

However, in further examples, the shelter system 100 can be configured for permanent or semi-permanent coupling with a vehicle 101 such as a truck or can be an integral part of a vehicle in contrast to being an aftermarket product. Accordingly, while various examples can be configured for aftermarket coupling with the bed of a truck, this should not be construed to be limiting on the wide variety of alternative configurations and uses which are contemplated within the scope and spirit of the present invention.

In various examples, the shelter system 100 can be expandable and collapsible in various suitable ways. For example, as discussed above, FIGS. 1a and 1b illustrate respective examples of a collapsed configuration 100A and expanded configuration 100B. In various embodiments, shelter system 100 does not extend past the cab of the vehicle 101 in the collapsed configuration 100A and does extend past the cab of the vehicle 101 in the extended configuration 100B. In further embodiments, the side faces of the shelter system 100 do not extend past side faces of the vehicle 101 in the collapsed configuration 100A and do extend past the side faces of of the vehicle 101 in the extended configuration 100B. Expanding and collapsing of the shelter system 100 can be done in various suitable ways, including manual configuration by a user or via motorized configuration.

Figure 2A:
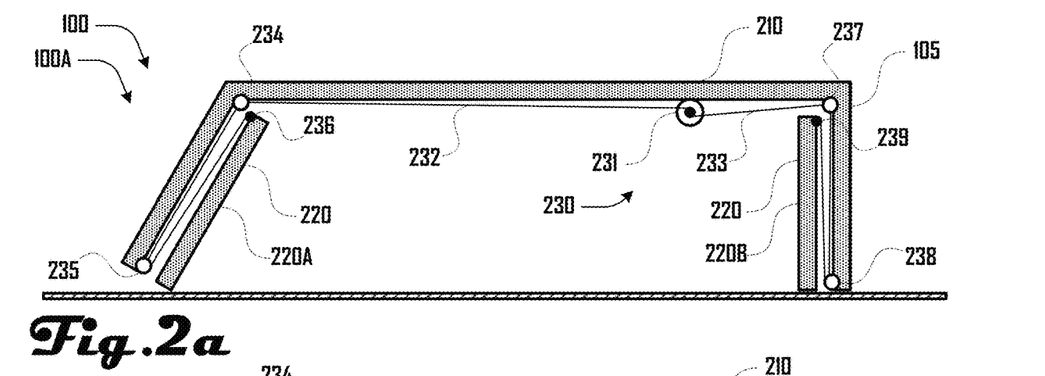
FIG. 2a is an exemplary cutaway side-view illustrating an embodiment of an expandable vehicle shelter system in a collapsed configuration.
Figure 2B:
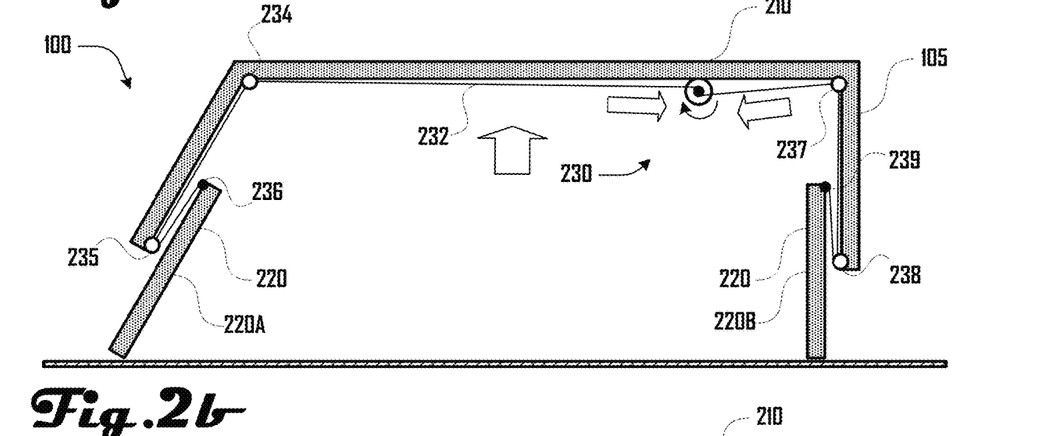
FIG. 2b is an exemplary cutaway side-view illustrating the expandable vehicle shelter system of FIG. 2a expanding via an expansion assembly.
Figure 2C:
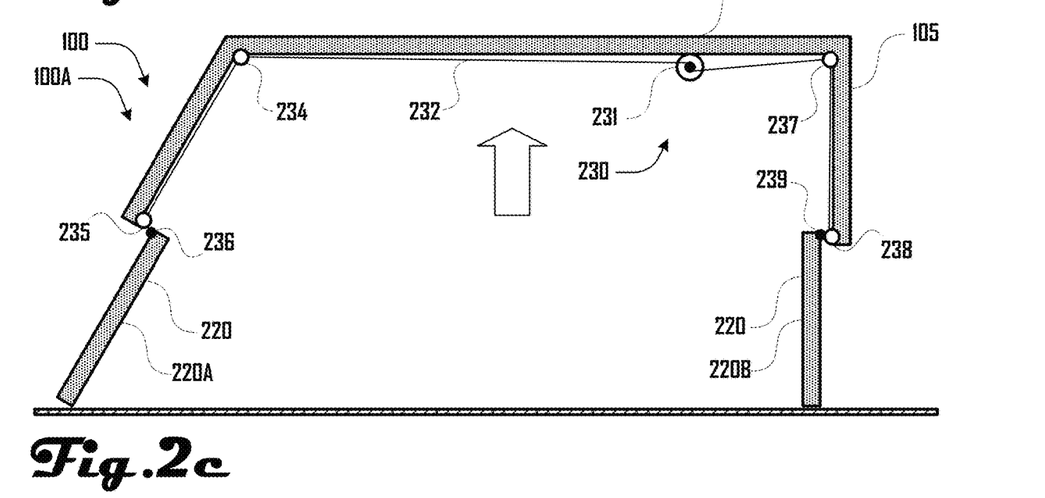
FIG. 2c is an exemplary cutaway side-view illustrating the expandable vehicle shelter system of FIGS. 2a and 2b in an expanded configuration.

Turning to FIGS. 2a, 2b and 2c, one example of transitioning the shelter system 100 between a collapsed configuration 100A and expanded configuration 100B is shown. In this example, the shelter system 100 comprises a top portion 210 and one or more bottom portions 220, with the top portion 210 being configured to expand over the bottom portion(s) 220. The top and bottom portions 210, 220 can be slidably coupled together as discussed in more detail herein to facilitate such expansion. Expansion and collapsing of the shelter system 100 can be actuated by an expansion assembly 230 that comprises a spool 231, which is operably coupled with a first and second line 232, 233 that facilitate movement of the top portion 210 relative to the bottom portion(s) 220.

In the example of FIGS. 2a-c, the first line 232 extends from the spool 231, through a first pulley 234, through a second pulley 235 proximate to a bottom end of the top portion 210, and to a first anchor 236 proximate to a top end of a first bottom portion 220A. Similarly, the second line 233 extends from the spool 231, through a third pulley 237, through a fourth pulley 238 proximate to a second bottom end of the top portion 210, and to a second anchor 239 proximate to a top end of a first bottom portion 220B.

As illustrated in FIG. 2a, the shelter system 100 can begin in a collapsed configuration with the top and bottom portions 210, 220 nested together and with the lines 232, 233 in an extended configuration. As illustrated in FIG. 2b, the lines 232, 233 can be wound on the spool 231 via rotation of the spool 231, which shortens the length of the lines 232, 233 between the spool 231 and respective anchors 236, 239. Rotation of the spool 231 can be generated in various suitable ways including via manual rotation by a user, via a motor, or the like. For example, in some embodiments, the spool 231 can be actuated by an electric motor, which can be powered by a battery or other suitable power source, which may or may not be associated with a vehicle. In other words, in some embodiments, an electric motor that rotates the spool 231 can be powered from a vehicle battery or vehicle power system and/or via a battery or other power source that is independent from such a vehicle battery or vehicle power system.

Additionally, further embodiments can include any suitable additional or alternative mechanism for moving the top and bottom portions 210, 220 relative to each other. For example, one embodiment can include electric cylinders that are attached at suitable locations, such as at all four corners of the top portion 210.

Returning to FIGS. 2a-c, shortening of the lines 232, 233 can cause the top portion 210 to rise relative to the bottom portion(s) 220 which can be held together via slidable couplings between the top and bottom portions 210, 220 (e.g., via a sliding track, roller track or the like). As shown in FIG. 2c, the top portion 210 can reach a maximum expansion height in an expanded configuration of the shelter system 100, with lines 232, 233 being at a minimum length between the spool 231 and anchors 236, 239 with the lines 232, 233 holding the top and bottom portions 210, 220 in their relative positions.

Although FIGS. 2a-c illustrate an example embodiment of shelter system 100 where the first bottom portion 220A is disposed at an obtuse angle relative to a top plane of the top portion 210 and the second bottom portion 220B is disposed at a right angle to the top plane of the top portion 210, this should not be construed to be limiting on the many various suitable configurations of the top and bottom portions 210. For example, in some embodiments, the first and second bottom portions 220A, 220B can both be disposed at right angles relative to the top portion 210. Accordingly, the example configurations herein should not be construed to be limiting on the wide variety of shapes, sizes, angles, and configurations of the top and bottom portions 210, 220.

Figure 10:
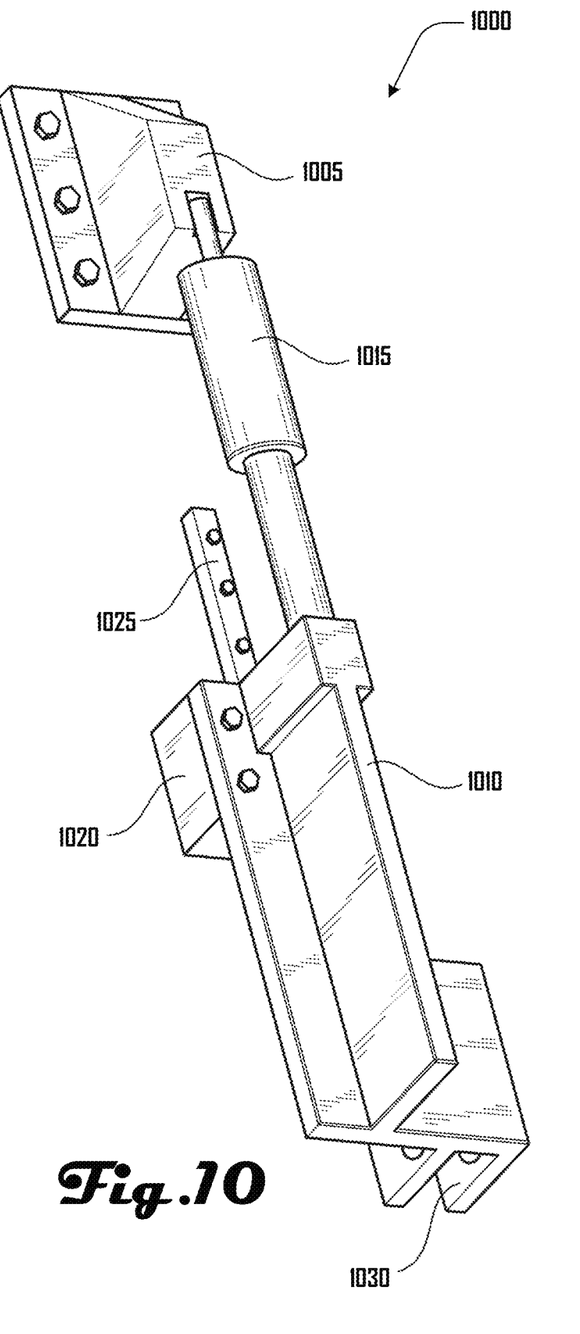
FIG. 10 is a perspective view of a height booster.
Figure 11A:
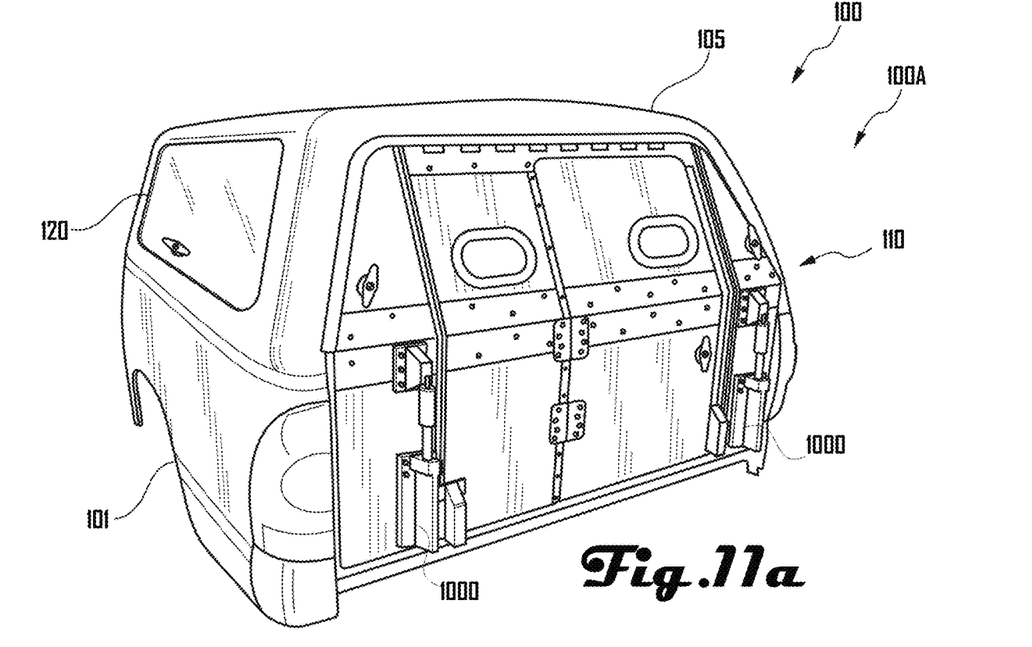
FIG. 11a is an exemplary perspective drawing illustrating an embodiment of the expandable vehicle shelter system of FIG. 1a in a collapsed configuration and including a pair of height boosters.
Figure 11B:
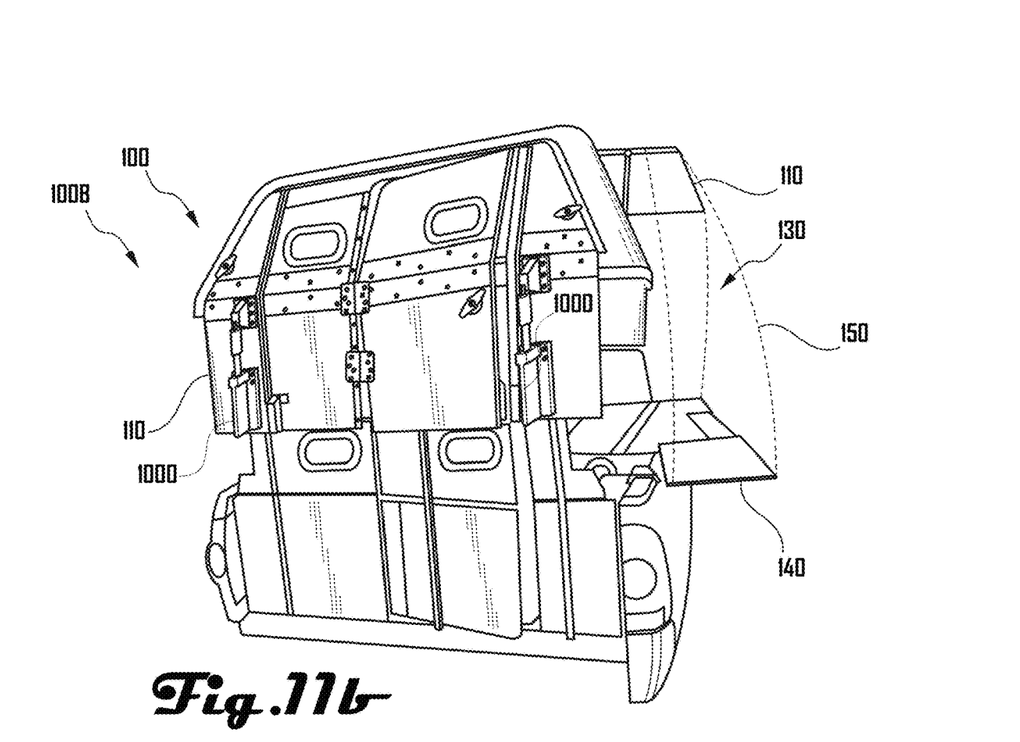
FIG. 11b is a perspective drawing of the expandable vehicle shelter system of FIG. 11a in an expanded configuration.

In some embodiments, the shelter system 100 can comprise one or more height boosters 1000 as illustrated in FIGS. 10, 11a and 11b. As shown in FIG. 10, a height booster 1000 can comprise an actuator support bracket 1005 and a lower support bracket 1010, which are connected via a linear actuator 1015. A linear bearing 1020 can be coupled with the lower support bracket 1010 with the linear bearing 1020 configured to slide up and down on a rail 1025 that is coupled to the rear door of shelter system 100.

As shown in FIGS. 11*a* and 11*b*, one example embodiment can include a pair of height boosters 1000 coupled to the door assembly 110, which are configured to assist with actuating the shelter system between the collapsed configuration 100A and the extended configuration 100B.

Figure 3A:
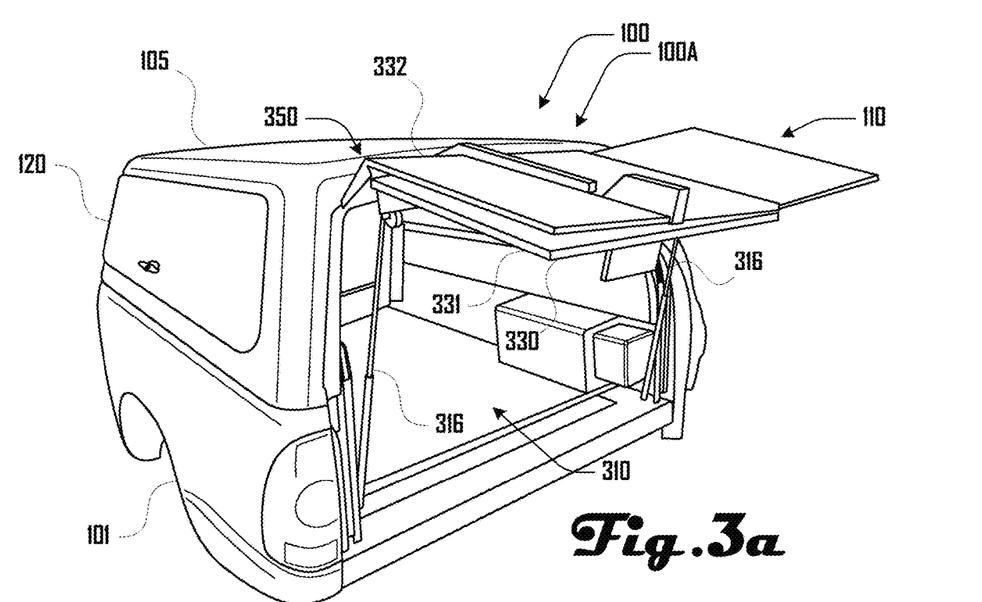
FIG. 3a is a perspective drawing of a door assembly of the expandable vehicle shelter system in a raised position.

Turning to FIGS. 3*a*, 3*b*, 4, 5*a* and 5*b*, the door assembly 110 can be configured to open in various suitable ways to provide access to a shelter cabin 310 defined by the vehicle 101 and the shelter system 100. For example, in some embodiments, the entire door assembly 110 can rotatably coupled to the shell 105 via a hinge 315 at a top portion of the door assembly 110, which allows the door assembly 110 to rotate upward to an open position as illustrated in FIG. 3*a*. In some examples, such actuation can be assisted by hydraulic rods 316, which can also be configured to hold the door assembly 110 in an open position.

Figure 3B:
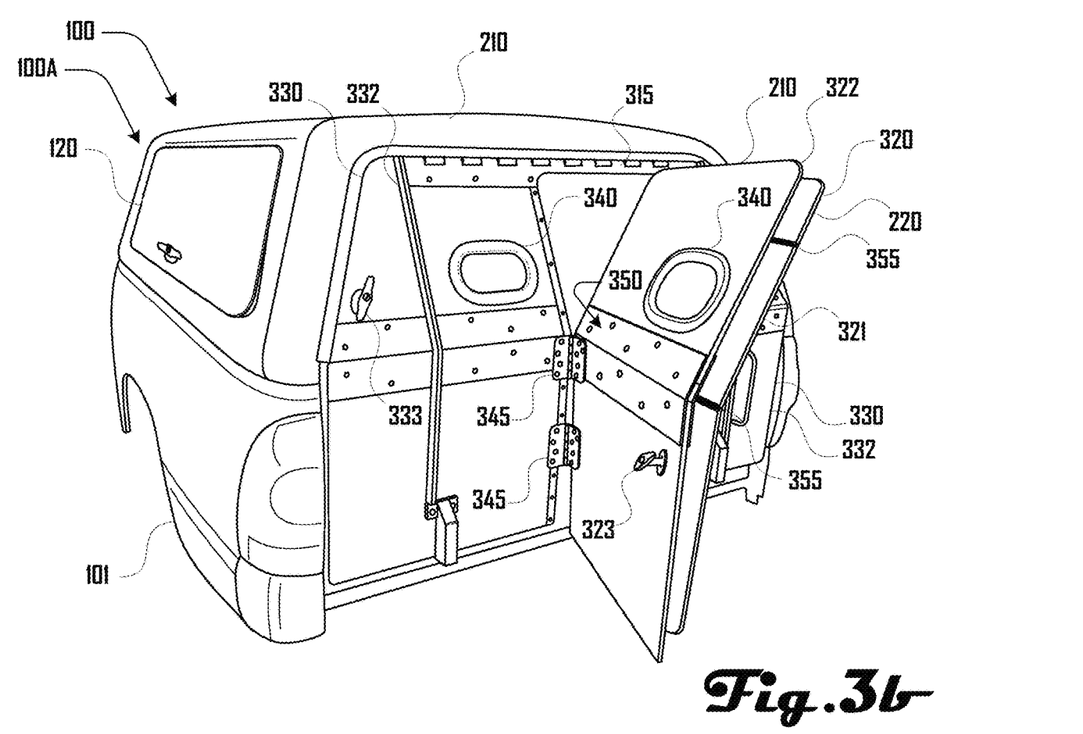
FIG. 3b is a perspective drawing of a sub-door of the door assembly of FIG. 3a in an open configuration.
Figure 4:
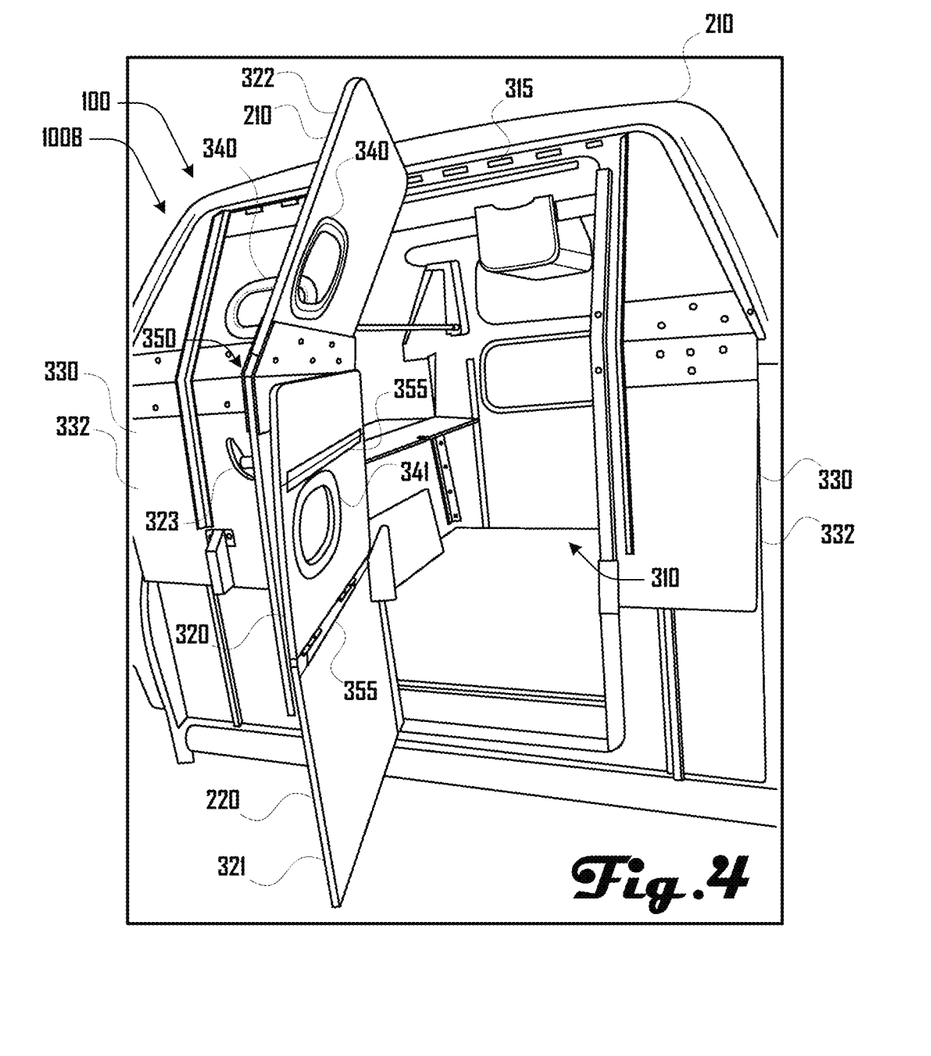
FIG. 4 is a perspective drawing of the expandable vehicle shelter system of FIGS. 3a and 3b in an expanded configuration and with the sub-door of the door assembly in an open configuration.

Additionally, as illustrated in FIGS. 3*b* and 4, in some embodiments, a sub-door 320 portion of the door assembly 110 can be configured to open and close to provide access to and from the shelter cabin 310. For example, the door assembly 110 can comprise one or more frame portions 330 that surround the sub-door 320, which can be opened and closed about the frame portions 330 while the shelter system 100 is in the collapsed configuration 100A, as illustrated in FIG. 3*b*. Additionally, as illustrated in FIG. 4, in some embodiments, the sub-door 320 can also be opened while in the extended configuration 100B.

Figure 5A:
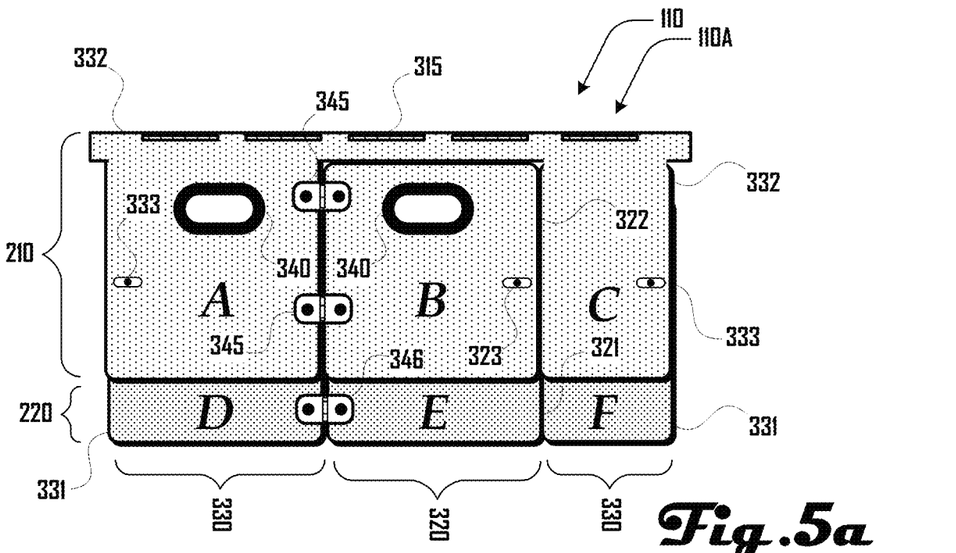
FIG. 5a is a front-view drawing of a door assembly in a compressed configuration.
Figure 5B:
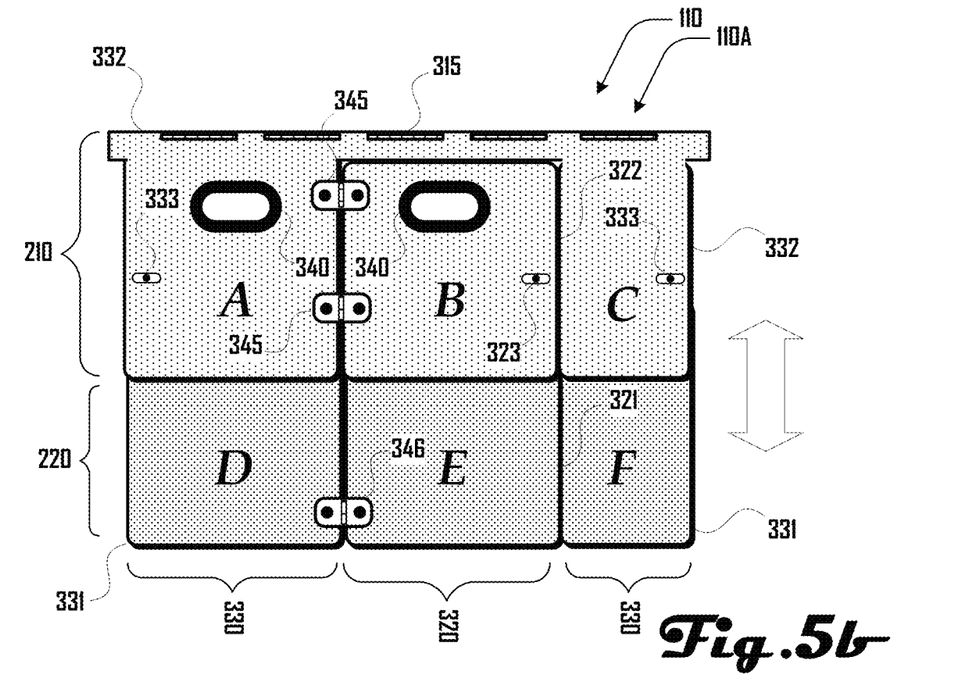
FIG. 5b is a front-view drawing of the door assembly of FIG. 5a in an expanded configuration.

Turning to FIGS. 5*a* and 5*b*, an example embodiment of the door assembly 110 is illustrated in a collapsed configuration 110A and in an expanded configuration 100B respectively. In this example, the door assembly 110 is shown comprising a sub-door 320 disposed within frame portions 330. The sub-door 320 comprises panel portions A and E, with panel portion E being an internal sub-door panel 321, which is slidably coupled to panel portion E, which is an external sub-door panel 322.

The frame portions 330 comprise panel portions A, C, D and F with panel portions D and F being internal frame portions 331 and panel portions A and C being external panel portions. In various embodiments, panel portions A and D can be slidably coupled and panel portions C and F can be slidably coupled.

The frame portions 330 can be coupled at a top end of a door assembly 110, which can comprise a hinge 315 as described herein. The hinge can be coupled to the shell 105 (not shown in FIGS. 5*a* and 5*b*), which can make the external frame portions 332 part of a top portion 210 of the shelter system 100. Additionally, the external sub-door panel 322 (panel portion B), can be coupled to external frame portions 332 via hinges 345, which can make the external sub-door panel 322 (panel portion B) a part of a top portion 210 of the shelter system 100. For example, as shown in FIGS. 5*a* and 5*b*, panel portion B is shown being coupled to panel portion A.

The internal sub-door panel 321 (panel portion E) can be coupled to the internal frame portions 331 via a hinge 346, which can make the internal sub-door panel 321 (panel portion E) a part of a bottom portion 220 of the shelter system 100. For example, as shown in FIGS. 5*a* and 5*b*, panel portion E is shown being coupled to panel portion D. Accordingly, in this example, panel portions A, B and C can define a top portion 210 of the shelter system 100 and panel portions D, E and F can define a bottom portion 220 of the shelter system 100. As discussed herein, the top and bottom portions 210, 220 can move relative to each other (e.g., as shown and described relative to FIGS. 2*a-c*).

Additionally, the sub-door 320 can be configured to open and close relative to the frame portions 330. For example, with the internal sub-door panel 321 (panel portion E) and external sub-door panel 322 (panel portion B) coupled to the frame portions 330 via hinges 345, 346, the sub-door 320 can open and close via the hinges 345, 346 regardless of whether the door assembly 110 is in a compressed configuration 110A, an expanded configuration 110B, or a configuration therebetween.

In various embodiments, the sub-door 320 can be opened or closed via a handle 323 disposed on the external sub-door panel 322 (panel portion B). In other words, an assembly associated with the handle 323 can be configured to hold the sub-door 320 closed and actuation of the handle 323 can be used to open the sub-door 320. Similarly, the door assembly 110 as a whole can be configured to open and close (e.g., as illustrated in FIG. 3*a*). As with the handle 323 of the sub-door 320, the door assembly 110 can be opened and closed via one or more handles 333 disposed on the external frame portion 332. In other words, an assembly associated with the handle(s) 333 can be configured to hold the door assembly 110 closed and actuation of the handle 333 can be used to open the door assembly 110.

In various embodiments, the door assembly 110 can comprise windows 340, 341 as illustrated, for example, in FIGS. 3*b*, 4, 5*a* and 5*b*. In embodiments where the door assembly 110 comprises overlapping nested panels as discuss herein, it can be desirable to have corresponding windows 340, 341 such that a user can see through both windows 340, 341 when the door assembly 110 is in a compressed configuration. In other words, the windows 340, 341 disposed on the respective internal and external portions of the door assembly 110 can be configured to be aligned such that a user can see through both portions via the windows 340, 341 in at least one configuration.

In various embodiments, panel portions A, B, C, D, E and F can be substantially planar. However in further embodiments, such panel portions A, B, C, D, E and F can be curved, bent or angled in various suitable ways. In such embodiments, such a shape of the panel portions A, B, C, D, E and F can be permanent or the shape of the panel portions A, B, C, D, E and F can be dynamic.

For example, as illustrated in FIGS. 3*a*, 3*b* and 4, the door assembly 110 can comprise an angled joint portion 350, that extends laterally along the face of door assembly 110 such that a lower portion of the door assembly 110 is substantially perpendicular to the ground and an upper portion is at a non-perpendicular angle. In some embodiments, the outer portions 322, 332 of the door assembly 110 can have a permanent bend along the angled joint portion 350 and the internal portions 321, 331 can comprise one or more dynamic joints 355 configured to allow the internal portions 321, 331 to match the contour of the outer portions 322, 332 based on the door assembly 110 being in a collapsed configuration 110A, in an expanded configuration 110B or a configuration therebetween.

For example, FIG. 3*b* shows a side profile of the internal and outer portions 321, 322 of the sub-door assembly 320, where dynamic joints 355 of the internal portion 321 allow the internal portion 321 to match the bent contour of the outer portion 322 of the sub-door assembly 320 in a compressed configuration 110A. In contrast, FIG. 4 illustrates an expanded configuration of the sub-door assembly 320, wherein the outer portion 322 maintains a bent configuration, whereas the dynamic joints 355 of the internal portion 321 of the sub-door assembly 320 allow the internal portion 321 to assume a planar profile that is substantially perpendicular to the ground as is the lower portion of the outer portion 322 of the sub-door assembly 320. The one or more dynamic joints 355 can comprise any suitable dynamic joint mechanism, including a flexible material, a biased hinge, or the like.

Figure 6A:
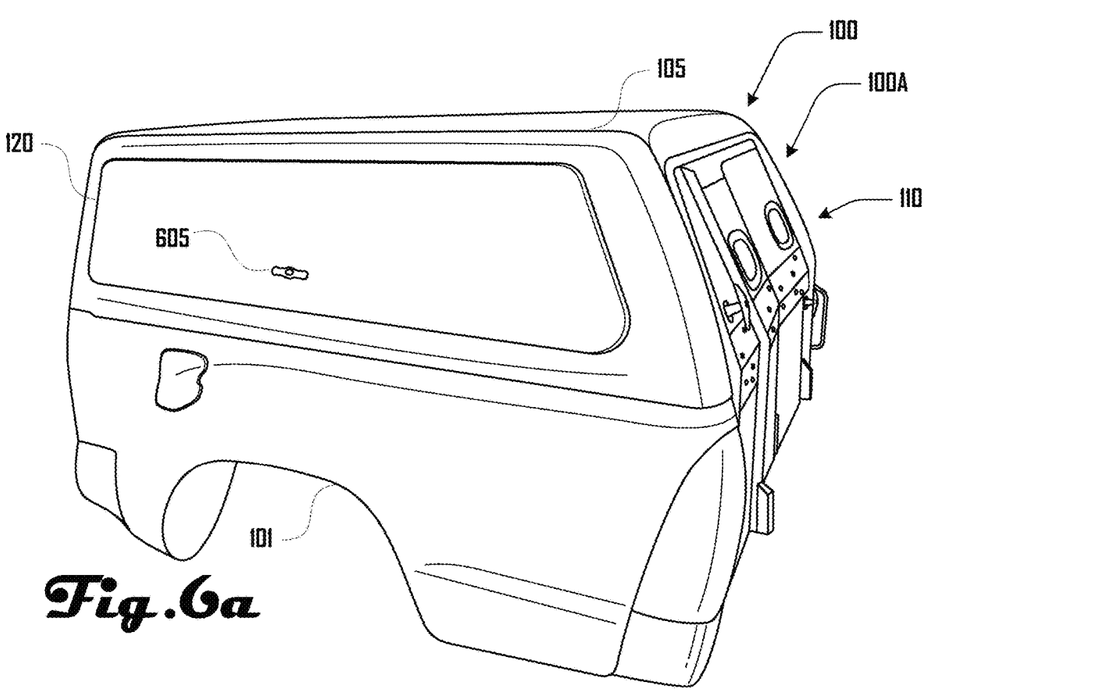
FIG. 6a is a side-perspective view of a hatch of the expandable vehicle shelter system in a closed position.
Figure 6B:
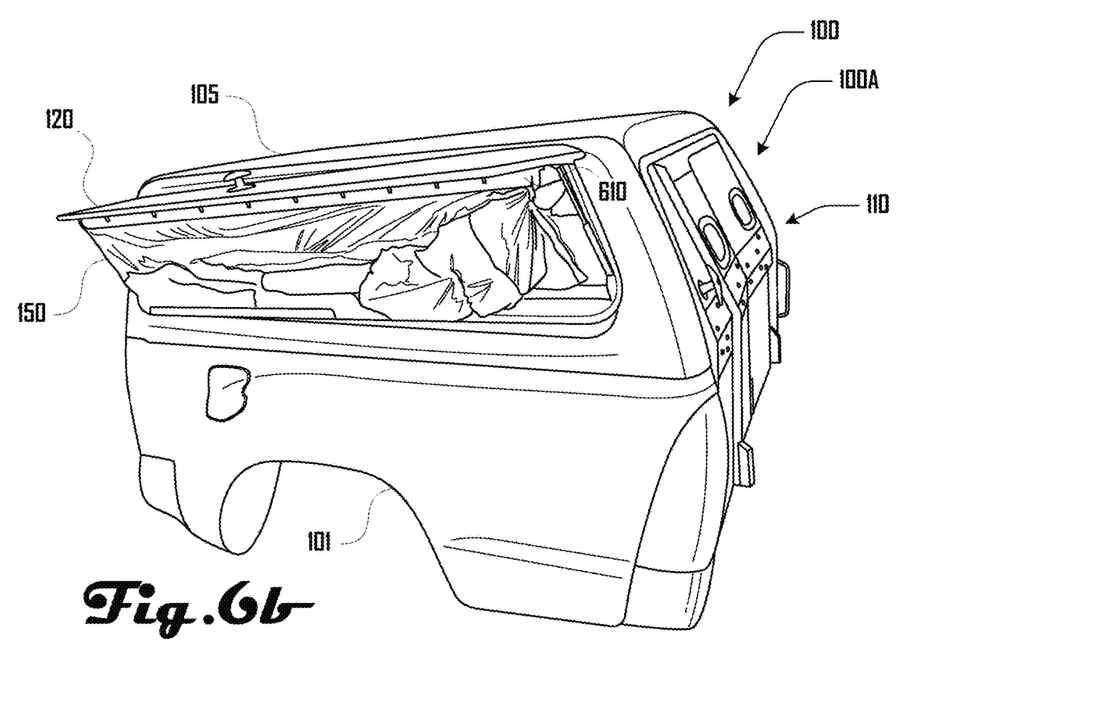
FIG. 6b is a side-perspective view of the hatch of FIG. 6a in an open position with a curtain exposed.
Figure 7:
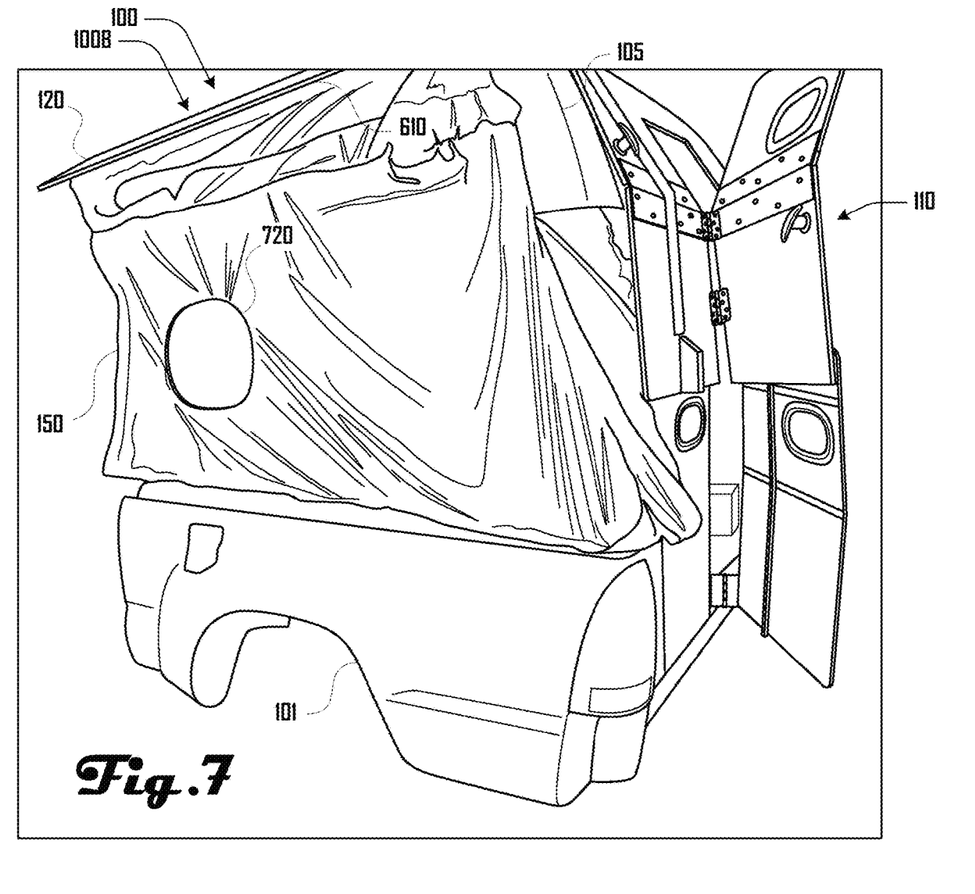
FIG. 7 is a side-perspective view of the expandable vehicle shelter system of FIGS. 6a and 6b in an expanded configuration with the hatch open and the curtain defining a compartment.

Turning to FIGS. 6a, 6b and 7 (and also illustrated in FIG. 1b), the shelter system 100 can comprise a first and second hatch 120 disposed on opposing sides of the shell 105. FIG. 6a illustrates a compressed configuration 100A of the shelter system 100 with a hatch 120 closed. FIG. 6b illustrates a compressed configuration 100A of the shelter system 100 with the hatch 120 open and the curtain 150 shown exposed and coupled along a forward edge 610 of the hatch 120.

In the expanded configuration 100B illustrated in FIG. 7, the curtain 150 is shown expanded and including a window 720. FIG. 1b illustrates that the hatches 120 can open to define compartments 130 on opposing sides of the shell 105, which are also defined by a respective platform 140 and curtain 150, which are described in more detail herein. In various embodiments, the curtain 150 can define a closed compartment 130 by being coupled to the shell 105 and/or vehicle 101 at suitable portions as illustrated in FIG. 7 or can define an open compartment 130 as illustrated in FIG. 1b.

For example, in some embodiments, the curtain 150 can be removably coupled to the shell 105 and/or vehicle 101 along various suitable lengths such that the compartment 130 can be accessed via an opening defined at least in part by the curtain 150. Such a removable coupling can comprise various suitable couplings, including a zipper, hook and loop tape, snaps, and the like. Additionally, in further embodiments, a door or access port can be formed in the curtain via such suitable couplings.

In various embodiments, portions of the shelter system 100 such as the shell 105 and door assembly 110 can comprise a rigid material such as metal, plastic, wood, composite, or the like. In contrast, in various embodiments, the curtain 150 can comprise a flexible material such as a fabric, plastic or the like, which can fold and be housed behind the hatches 120 in various configurations.

Figure 8A:
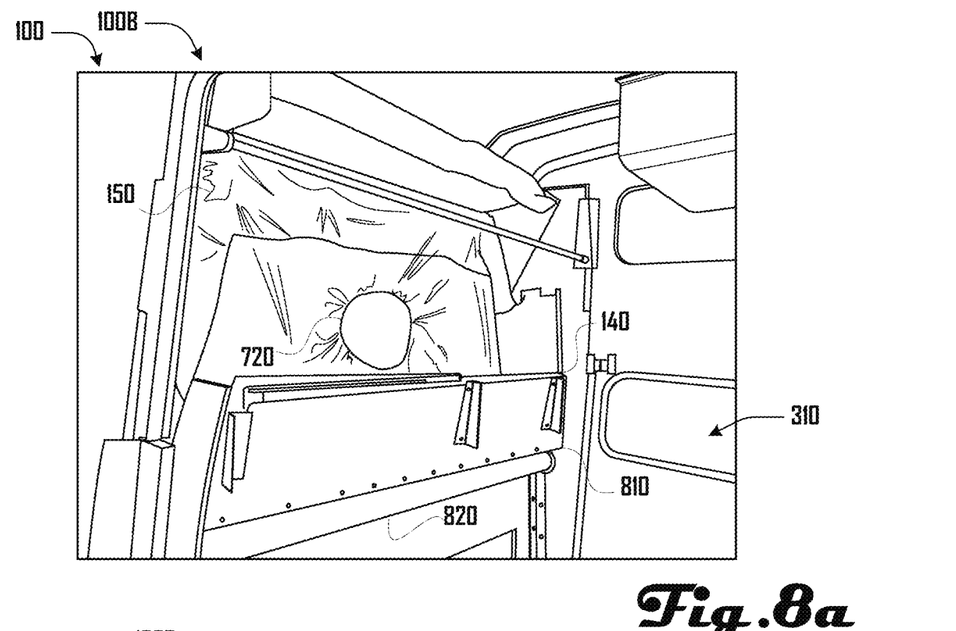
FIG. 8a is perspective view of a platform within the cabin of an expandable vehicle shelter system with the platform in a folded configuration.
Figure 8B:
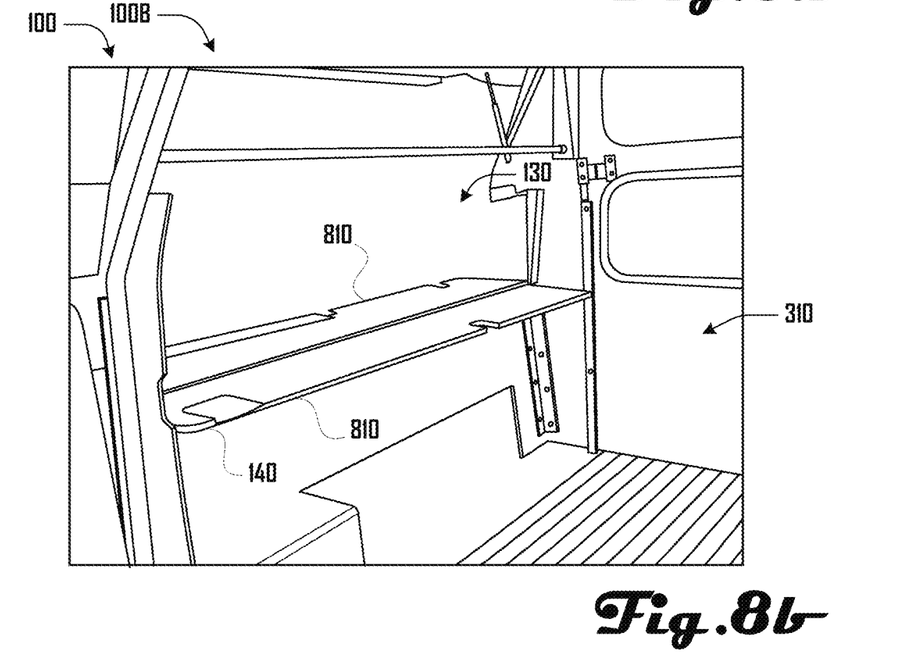
FIG. 8b is perspective view of the platform of FIG. 8a in an unfolded configuration.

Turning to FIGS. 8a and 8b, the shelter system 100 can also include one or more foldable platform 140 that defines a portion of the compartment 130. For example, as shown in FIGS. 8a and 8b, the foldable platform 140 can comprise a pair of elongated arms 810 that are rotatably coupled to bar 820 that extends between ends of the shelter system 100 within the cabin 310. As shown in FIG. 8a, the arms 810 can be folded upward in a storage configuration and unfolded as illustrated in FIGS. 8b (and 1b) to define a portion of the compartment 130.

Figure 9:
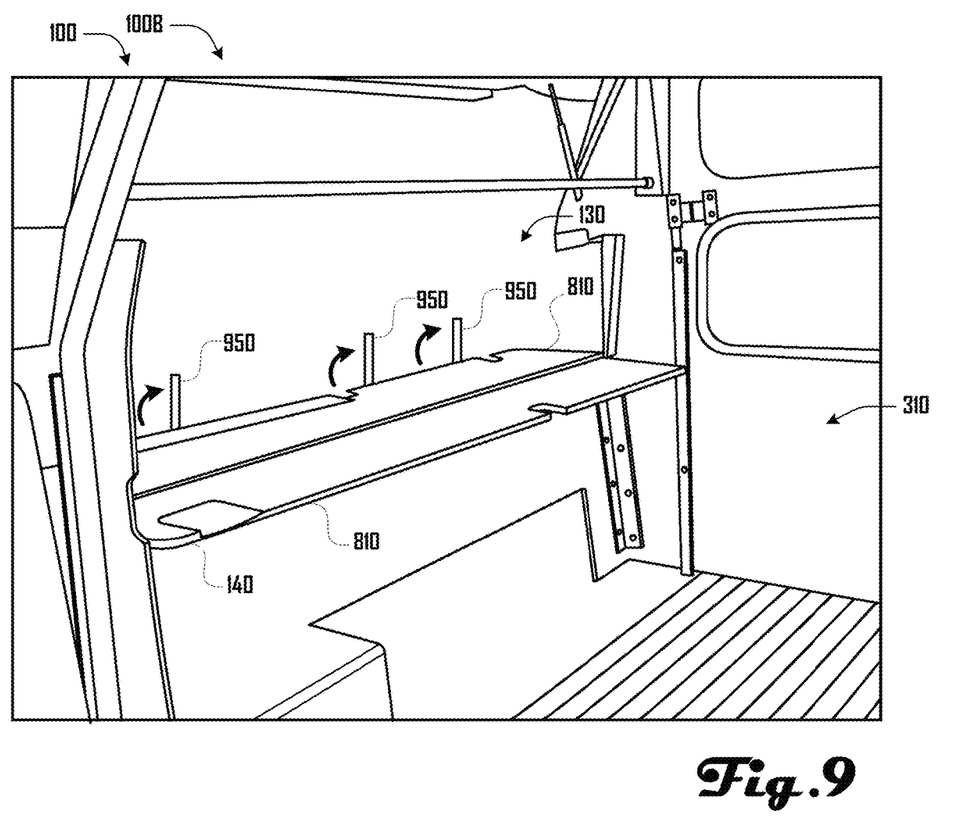
FIG. 9 is perspective view of the platform of FIG. 8b in an unfolded configuration with a set of support tabs shown in a flipped up configuration.

In some embodiments, the foldable platform 140 can comprise a set of support tabs 950 that are configured to flip up on edges of one or both of the arms 810. Such support tabs 950 can be desirable because they can prevent a user residing on the foldable platform 140 (e.g., sleeping) from rolling off the edge of the foldable platform 140.

In various embodiments, there can be one or more compartment 130. For example, in some embodiments, the shelter system 100 can be configured to form a pair of compartments 130 on opposing sides of the shell 150, with the compartments 130 extending outward from the shell 105 and expanding the volume of the cabin 310 within the shelter system 100. However, in further embodiments, there can be a single compartment 130, more than two compartments, or the shelter system 100 can be configured without a compartment 130.

Compartments 130 and/or the cabin 310 of the shelter system 100 can be configured for various uses, including for sleeping, as a kitchen, for storage, as a lounge, as a bathroom, as a shower, and the like. For example, in some embodiments, the compartments 130 can be configured to generate a pair of sleeping compartments, or can be combined generate a single larger sleeping compartment within the cabin 130.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An aftermarket truck shelter system configured to removably couple with a bed of a truck, the aftermarket truck shelter system comprising:
    a top portion that includes:
        a first and second hatch on opposing lateral sides of the top portion, the first and second hatches configured to open outward to define respective first and second compartments on opposing lateral sides of aftermarket the truck shelter system that are defined at least in part by the first and second hatches and a respective first and second curtain that extends from the hatches;
    a bottom portion that includes:
        a first and second foldable platform on opposing lateral sides of the bottom portion and respectively defining a portion of the first and second compartments; and
    wherein the top and bottom portions are slidably coupled such that the top and bottom portions are operable to:
        assume a collapsed configuration with the top and bottom portions nested together with defining a shelter cabin having a first volume, and
        assume an extended configuration having the top portion extending upward with the shelter cabin having a second volume that is greater than the first volume; and
    a powered expansion assembly configured to actuate the shelter system from the collapsed configuration to the extended configuration.

2. An aftermarket truck shelter system configured to removably couple with a bed of a truck, the aftermarket truck shelter system comprising:
    a top portion that includes:
        a first and second hatch on opposing lateral sides of the top portion, the first and second hatches configured to open outward to define respective first and second compartments on opposing lateral sides of aftermarket the truck shelter system that are defined at least in part by the first and second hatches and a respective first and second curtain that extends from the hatches;
    a bottom portion that includes:
        a first and second foldable platform on opposing lateral sides of the bottom portion and respectively defining a portion of the first and second compartments; and
    wherein the top and bottom portions are slidably coupled such that the top and bottom portions are operable to:

assume a collapsed configuration with the top and bottom portions nested together with defining a shelter cabin having a first volume, and assume an extended configuration having the top portion extending upward with the shelter cabin having a second volume that is greater than the first volume; and wherein the bottom portion comprises a first bottom portion disposed at an obtuse angle relative to a top plane of the top portion and a second bottom portion disposed at a right angle to the top plane of the top portion.

3. The aftermarket truck shelter system of claim 2, wherein the first bottom portion and the second bottom portion are slidably coupled to the top portion such that the first bottom portion and the second bottom portion slide parallel to respective parts of the top portion that the first bottom portion and the second bottom portion are coupled to during movement between the collapsed configuration and the extended configuration.

4. The aftermarket truck shelter system of claim 1, wherein during movement from the collapsed configuration to the extended configuration, the bottom portion remains stationary and the top portion elevates relative to the stationary bottom portion and wherein during movement from the extended configuration to the collapsed configuration, the bottom portion remains stationary and the top portion lowers relative to the stationary bottom portion.

5. The aftermarket truck shelter system of claim 1, wherein the electric expansion assembly comprises an electrically powered spool disposed at a ceiling of the top portion, with the powered spool operably coupled with a separate first and second line that facilitate movement of the top portion relative to the bottom portion between the extended configuration and the collapsed configuration, the first line coupled to a first bottom portion and the second line coupled to a second bottom portion.

6. A shelter system configured to removably couple with a vehicle, the shelter system comprising:
a top portion;
a bottom portion; and
wherein the top and bottom portions are slidably coupled such that the top and bottom portions are operable to assume a collapsed configuration with the top and bottom portions nested together with a shelter cabin having a first volume and to assume an extended configuration having the top portion extending upward with the shelter cabin having a second volume that is greater than the first volume and
a powered expansion assembly configured to actuate the shelter system from the collapsed configuration to the extended configuration.

7. The shelter system of claim 6, wherein the bottom portion comprises a first bottom portion and a second bottom portion.

8. The shelter system of claim 7, wherein one or both of the first and second bottom portions are disposed at a right angle to a top plane of the top portion.

9. The shelter system of claim 7, wherein the first bottom portion and the second bottom portion are slidably coupled to the top portion such that the first bottom portion and the second bottom portion slide parallel to respective parts of the top portion that the first bottom portion and the second bottom portion are coupled to during movement between the collapsed configuration and the extended configuration.

10. The shelter system of claim 6, wherein during movement from the collapsed configuration to the extended configuration, the bottom portion remains stationary and the top portion elevates relative to the stationary bottom portion and wherein during movement from the extended configuration to the collapsed configuration, the bottom portion remains stationary and the top portion lowers relative to the stationary bottom portion.

11. The shelter system of claim 6, wherein the top portion comprises a first hatch configured to open to open outward to define a first compartment defined at least in part by the first hatch and a first curtain that extends from the first hatch to the bottom portion.

12. The shelter system of claim 11, wherein the top portion further comprises a second hatch configured to open outward to define a second compartment defined at least in part by the second hatch and a second curtain that extends from the second hatch to the bottom portion.

13. The shelter system of claim 6, wherein the bottom portion further comprises a first foldable platform.

14. The shelter system of claim 13, wherein the bottom portion further comprises a second foldable platform disposed parallel to the first foldable platform on an opposing lateral side of the bottom portion.

15. The shelter system of claim 14, wherein the first and second foldable platform each comprise a pair of elongated arms that are rotatably coupled to a bar that extends between ends of the shelter system within the shelter cabin, the arms configured to be folded upward in a storage configuration and unfolded in platform configuration.

16. The shelter system of claim 6, wherein the powered expansion assembly comprises a powered spool, with the powered spool being operably coupled with a separate first and second line that facilitate movement of the top portion relative to the bottom portion between the extended configuration and the collapsed configuration.

17. The shelter system of claim 6, wherein the powered expansion assembly comprises at least two height boosters disposed on opposing sides of the shelter system, the at least two height boosters each including a linear actuator configured to actuate the shelter system from the collapsed configuration to the extended configuration.

18. An aftermarket truck shelter system configured to removably couple with a bed of a truck, the aftermarket truck shelter system comprising the shelter system of claim 6.

19. A method of using a shelter system comprising:
at a first location, coupling the shelter system of claim 6 with a bed of a truck, the shelter system being in the collapsed configuration;
driving the truck to a second location with the shelter system being in the collapsed configuration;
at the second location, configuring the shelter system from the collapsed configuration to the extended configuration;
at the second location, configuring the shelter system from the extended configuration to the collapsed configuration;
driving the truck to a third location with the shelter system being in the collapsed configuration; and
at the third location, removing the shelter system from the bed of the truck with the shelter system being in the collapsed configuration.

* * * * *